(12) United States Patent
Morio et al.

(10) Patent No.: US 11,549,576 B2
(45) Date of Patent: Jan. 10, 2023

(54) RESIN GEAR

(71) Applicant: Showa Denko Materials Co., Ltd., Tokyo (JP)

(72) Inventors: Yoichi Morio, Tokyo (JP); Tatsuya Aoyagi, Tokyo (JP)

( * ) Notice: Subject to any disclaimer, the term of this patent is extended or adjusted under 35 U.S.C. 154(b) by 136 days.

(21) Appl. No.: 16/972,617

(22) PCT Filed: Jun. 21, 2018

(86) PCT No.: PCT/JP2018/023687
§ 371 (c)(1),
(2) Date: Dec. 7, 2020

(87) PCT Pub. No.: WO2019/244309
PCT Pub. Date: Dec. 26, 2019

(65) Prior Publication Data
US 2021/0231206 A1 Jul. 29, 2021

(51) Int. Cl.
*F16H 55/06* (2006.01)
*F16H 55/14* (2006.01)
*F16H 55/17* (2006.01)

(52) U.S. Cl.
CPC ............. *F16H 55/06* (2013.01); *F16H 55/14* (2013.01); *F16H 55/17* (2013.01)

(58) Field of Classification Search
CPC .......................... F16H 2055/065; F16H 55/17
See application file for complete search history.

(56) References Cited

U.S. PATENT DOCUMENTS

| 1,928,763 | A | * | 10/1933 | Rosenberg | F16D 3/76 464/99 |
| 3,245,229 | A | * | 4/1966 | Fadler | F16D 3/14 464/99 |
| 3,952,546 | A | * | 4/1976 | Nakano | F16D 3/76 416/134 A |
| 4,674,351 | A | * | 6/1987 | Byrd | F16H 57/0025 74/411 |

(Continued)

FOREIGN PATENT DOCUMENTS

| CN | 104500693 | 4/2015 |
| JP | S61-019159 | 2/1986 |

(Continued)

OTHER PUBLICATIONS

International Search Report dated Sep. 18, 2018 for PCT/JP2018/023687.

(Continued)

*Primary Examiner* — Terence Boes
(74) *Attorney, Agent, or Firm* — Soei Patent & Law Firm

(57) ABSTRACT

A space and an elastic member have a first part where a distance between an outer peripheral surface of a metal bush and an inner peripheral surface of a resin member is a first distance, a second part where the distance between the outer peripheral surface and the inner peripheral surface is a second distance different from the first distance, and a third part where the distance between the outer peripheral surface and the inner peripheral surface is a third distance different from the first distance in a cross section along a radial direction of a resin gear. The first part is provided between the second part and the third part in an axial direction of the resin gear.

20 Claims, 7 Drawing Sheets

(56) References Cited

U.S. PATENT DOCUMENTS

| | | | |
|---|---|---|---|
| 2002/0142881 A1 | 10/2002 | Bodtker et al. | |
| 2015/0226304 A1 | 8/2015 | Dumanski et al. | |
| 2021/0231204 A1* | 7/2021 | Morio | F16H 55/06 |
| 2021/0231205 A1* | 7/2021 | Morio | F16H 55/17 |

FOREIGN PATENT DOCUMENTS

| | | |
|---|---|---|
| JP | S63-126656 | 8/1988 |
| JP | 2007-056923 | 3/2007 |
| JP | 2017-015100 | 1/2017 |
| JP | 2017-089778 | 5/2017 |
| JP | 2017-115969 | 6/2017 |
| WO | 94/018476 | 8/1994 |

OTHER PUBLICATIONS

Extended Search Report in corresponding European Application No. 18923068.3, dated May 7, 2021.
International Preliminary Report on Patentability with Written Opinion dated Dec. 30, 2020 for PCT/JP2018/023687.

* cited by examiner

RESIN GEAR

CROSS-REFERENCE TO RELATED APPLICATIONS

This application is a 35 U.S.C. § 371 national phase application of PCT/JP2018/023687, filed on Jun. 21, 2018.

TECHNICAL FIELD

One aspect of the present invention relates to a resin gear.

BACKGROUND ART

Resin gears are lightweight, excellent in quietness, and widely used as, for example, vehicular or industrial gears. A resin gear including a metal bush, a resin member provided around the metal bush and having a tooth profile formed in an outer peripheral portion, and an elastic member provided between the metal bush and the resin member is known as a resin gear (see, for example, Patent Literature 1). In a case where an impact is applied to such a resin gear as a result of meshing with another gear, the impact is absorbed and damped by elastic deformation of the elastic member, that is, the damper effect (damping function) of the elastic member is obtained.

CITATION LIST

Patent Literature

Patent Literature 1: Japanese Unexamined Patent Publication No. 2017-015100

SUMMARY OF INVENTION

Technical Problem

In the resin gear described above, the elastic member is bonded by means of an adhesive to the outer peripheral surface of the metal bush and the inner peripheral surface of the resin member. In this case, the damper effect of the elastic member may not be sufficiently obtained depending on, for example, the degree of adhesion of the adhesive.

An object of one aspect of the present invention is to provide a resin gear allowing the damper effect of an elastic member to be sufficiently obtained.

Solution to Problem

A resin gear according to one aspect of the present invention is a resin gear including an annular metal bush and an annular resin member provided around the metal bush and having a tooth profile formed in an outer peripheral portion, in which the metal bush and the resin member are disposed so as to be relatively rotatable in a direction of rotation of the resin gear, a plurality of spaces entering an outer peripheral surface of the metal bush and an inner peripheral surface of the resin member are formed, so as to be aligned along the direction of rotation, between the metal bush and the resin member, an elastic member is disposed in the space, the space and the elastic member have a first part where a distance between the outer peripheral surface and the inner peripheral surface is a first distance, a second part where the distance between the outer peripheral surface and the inner peripheral surface is a second distance different from the first distance, and a third part where the distance between the outer peripheral surface and the inner peripheral surface is a third distance different from the first distance in a cross section along a radial direction of the resin gear, and the first part is provided between the second part and the third part in an axial direction of the resin gear.

In a case where an impact is applied to the resin gear according to one aspect of the present invention as a result of meshing with another gear, the resin member tends to rotate relative to the metal bush in the direction of rotation of the resin gear (hereinafter, also simply referred to as "relative rotation"). At this time, a pair of forces (shearing forces) in opposite directions are generated on the resin member side and the metal bush side of the elastic member disposed in the space, the elastic member is elastically deformed, and the elastic member acts as a detent against the relative rotation. As a result, in a case where an impact is applied as a result of meshing with another gear, the impact is sufficiently absorbed and damped by such elastic deformation. Accordingly, the damper effect of the elastic member can be sufficiently obtained.

In this resin gear, the first part is provided between the second part and the third part in the axial direction of the resin gear. As a result, in the resin gear, the distance between the outer peripheral surface of the metal bush and the inner peripheral surface 7 of the resin member differs in the axial direction of the resin gear (hereinafter, simply referred to as "axial direction") in the space and the elastic member, and thus axial movement of the elastic member in the space is restricted. Accordingly, in the resin gear, axial disengagement of the elastic member from the space can be prevented. Accordingly, in the resin gear, the damper effect of the elastic member can be more reliably obtained.

In the resin gear according to one aspect of the present invention, the first distance may be greater than the second distance and the third distance. As a result, in the resin gear, axial disengagement of the elastic member from the space can be reliably prevented.

In the resin gear according to one aspect of the present invention, the first distance may be less than the second distance and the third distance. As a result, in the resin gear, axial disengagement of the elastic member from the space can be reliably prevented.

In the resin gear according to one aspect of the present invention, the metal bush and the resin member may abut against each other so as to be slidable in the direction of rotation. As a result, it is possible to realize a configuration in which the metal bush and the resin member are disposed so as to be rotatable relative to each other.

In the resin gear according to one aspect of the present invention, the metal bush and the resin member may not be bonded to each other. As a result, it is possible to realize a configuration in which the metal bush and the resin member are disposed so as to be rotatable relative to each other.

In the resin gear according to one aspect of the present invention, the elastic member may be bonded to an inner surface of the space. In this case, the elastic member is unlikely to disengage from the space, the elastic member can be elastically deformed to a large extent, and thus it is also possible to cope with a case where a large impact is applied. Eventually, it is possible to realize the resin gear that is capable of coping with a high load.

In the resin gear according to one aspect of the present invention, the space may be a hole penetrating the resin gear along an axial direction of the resin gear. In this case, the elastic member can be easily provided between the metal bush and the resin member by injection molding.

Advantageous Effects of Invention

According to one aspect of the present invention, it is possible to provide a resin gear that is capable of sufficiently obtaining the damper effect of an elastic member.

BRIEF DESCRIPTION OF DRAWINGS

FIG. 4C is a diagram illustrating a continuation of FIG. 4B.

DESCRIPTION OF EMBODIMENTS

Hereinafter, an embodiment will be described in detail with reference to the accompanying drawings. In the description of the drawings, the same or corresponding elements will be denoted by the same reference symbols without redundant description.

Figure 1:
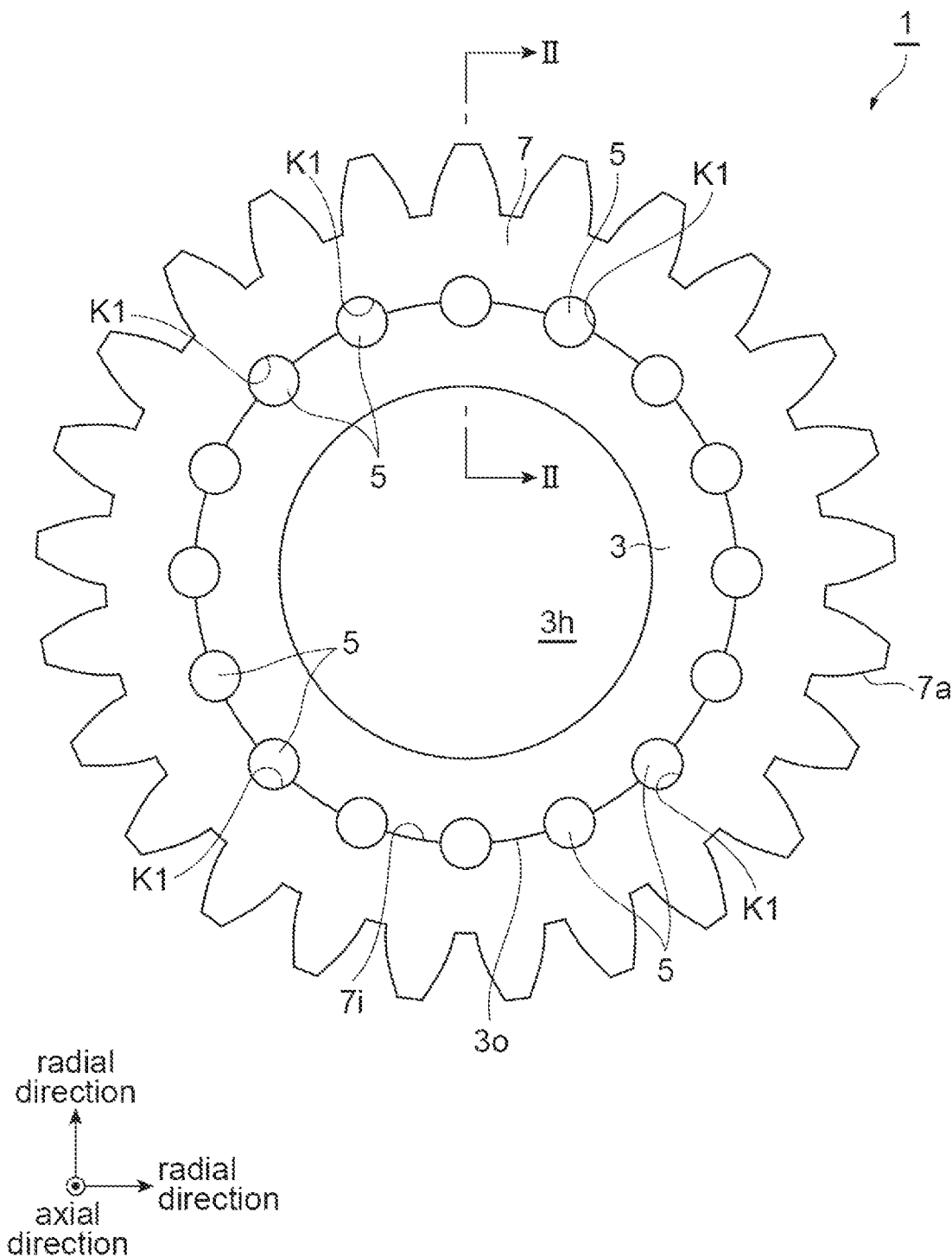
FIG. 1 is a front view of a resin gear according to one embodiment.
Figure 2:
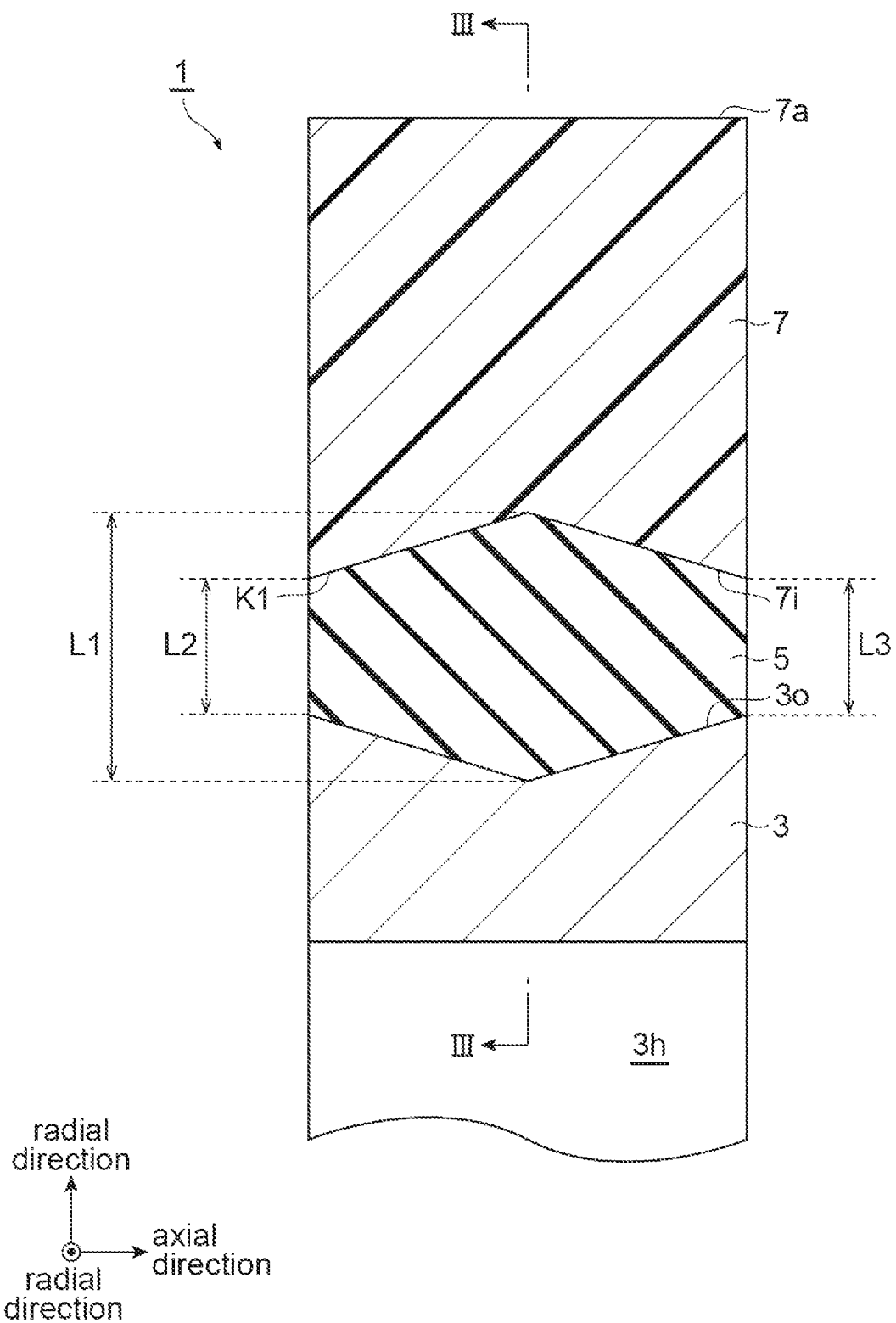
FIG. 2 is a cross-sectional view taken along line II-II of FIG. 1.

As illustrated in FIGS. 1 and 2, a resin gear 1 is a so-called high-strength resin gear and is used as a vehicular or industrial gear. For example, the resin gear 1 can be used as a balance shaft gear, a camshaft gear, or the like in an engine. The resin gear 1 includes a metal bush 3 and a resin member 7. The resin gear 1 is a spur gear.

The metal bush 3 is a member attached to, for example, a rotary shaft (not illustrated). The metal bush 3 has a circular ring shape. The metal bush 3 is formed of a metal such as stainless steel. The metal bush 3 is provided with a through hole 3h into which the rotary shaft is inserted.

The resin member 7 is a member meshing with another gear. The resin member 7 has an annular shape. The resin member 7 is formed of resin. The resin member 7 is provided around the metal bush 3. A tooth profile 7a is formed in the outer peripheral portion of the resin member 7. A plurality of the tooth profiles 7a are formed at predetermined intervals in the circumferential direction of the resin member 7. It should be noted that provision around an elastic member 5 includes not only being provided in direct contact around the elastic member 5 but also being provided via another member around the elastic member 5.

The metal bush 3 and the resin member 7 are disposed so as to be relatively rotatable in the direction of rotation of the resin gear 1 (hereinafter, also simply referred to as "direction of rotation"). Specifically, the metal bush 3 and the resin member 7 abut against each other so as to be slidable in the direction of rotation. More specifically, the outer diameter of the metal bush 3 and the inner diameter of the resin member 7 are equal to each other, an outer peripheral surface 3o of the metal bush 3 and an inner peripheral surface 7i of the resin member 7 are not bonded to each other, and the outer peripheral surface 3o and the inner peripheral surface 7i are in contact with each other in a relatively rotatable state.

In the resin gear 1 of the present embodiment, a plurality of spaces K1 entering the outer peripheral surface 3o of the metal bush and the inner peripheral surface 7i of the resin member 7 are formed, so as to be aligned along the direction of rotation, between the metal bush 3 and the resin member 7. The space K1 is a hole penetrating the resin gear 1 along the axial direction of the resin gear 1 (hereinafter, also simply referred to as "axial direction"). When viewed from the axial direction, the spaces K1 are arranged at equal intervals along the direction of rotation. The space K1 is defined by the U groove that is formed on the outer peripheral surface 3o and the U groove that is formed on the inner peripheral surface 7i of the resin member 7. In the radial direction of the resin gear 1 (hereinafter, also simply referred to as "radial direction"), the inside half of the space K1 enters the metal bush 3 side and the outside half of the space K1 enters the resin member 7 side.

The space K1 axially tapers from the middle portion to both end portions. The space K1 has a hexagonal cross section along the radial direction. In the cross section along the radial direction, the space K1 has a first part where the distance between the outer peripheral surface 3o of the metal bush 3 and the inner peripheral surface 7i of the resin member 7 is a first distance L1, a second part where the distance between the outer peripheral surface 3o and the inner peripheral surface 7i is a second distance L2 different from the first distance L1, and a third part where the distance between the outer peripheral surface 3o and the inner peripheral surface 7i is a third distance L3 different from the first distance L1. The first distance L1 is greater than the second distance L2 and the third distance L3 (L1>L2, L3). The second distance L2 and the third distance L3 are equal to each other (L2=L3). The first part is provided between the second part and the third part in the axial direction. In the present embodiment, the first part of the space K1 is the middle portion in the axial direction. The second part of the space K1 is one end portion in the axial direction, and the third part of the space K1 is the other end portion in the axial direction.

The elastic member 5 is disposed in the space K1. The elastic member 5 has a shape corresponding to the shape of the space K1. Specifically, the elastic member 5 has a shape coaxial with and equal in diameter to the space K1 with the axial direction being the height direction of the elastic member 5. In other words, in the cross section along the radial direction, the elastic member 5 has a first part where the distance between the outer peripheral surface 3o of the metal bush 3 and the inner peripheral surface 7i of the resin member 7 is the first distance L1, a second part where the distance between the outer peripheral surface 3o and the inner peripheral surface 7i is the second distance L2 different from the first distance L1, and a third part where the distance between the outer peripheral surface 3o and the inner peripheral surface 7i is the third distance L3 different from the first distance L1. The first part is provided between the second part and the third part in the axial direction.

The outer peripheral surface of the elastic member 5 abuts against the inner surface of the space K1. At least a part of the elastic member 5 is bonded to the inner surface of the space K1. The elastic member 5 is provided so as to come into contact with the inner surface of the space K1 via an adhesive.

The elastic member 5 is formed of rubber. The rubber is butadiene rubber, chloroprene rubber, butyl rubber, styrene butadiene rubber, nitrile rubber, ethylene propylene rubber, acrylic rubber, fluororubber, epichlorohydrin rubber, silicone rubber, or the like. From the viewpoint of durability and heat resistance, the rubber is preferably fluororubber or silicone rubber. The elastic member 5 may be configured by a plurality of members (rubber layers) being stacked.

Figure 3A:
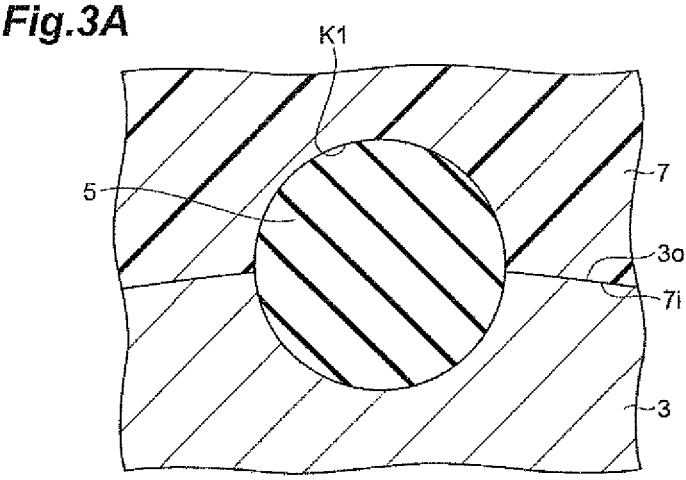
FIG. 3A is a cross-sectional view taken along line III-III of FIG. 2 for describing elastic deformation of an elastic member of the resin gear.
Figure 3B:
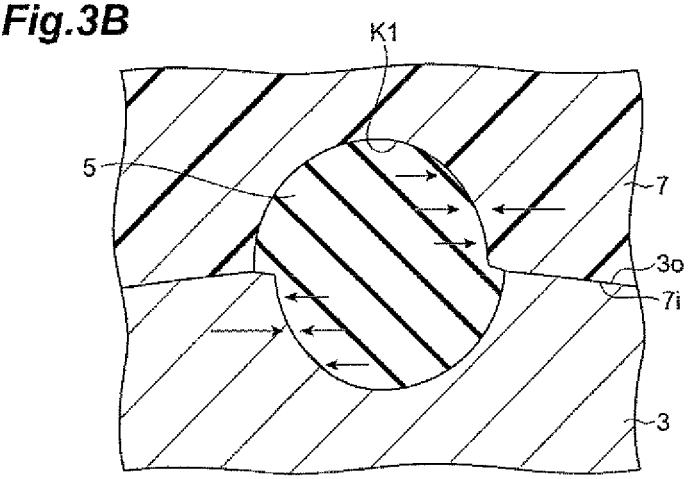
FIG. 3B is another cross-sectional view taken along line of FIG. 2 for describing the elastic deformation of the elastic member of the resin gear.

The elastic member 5 absorbs and damps the impact that is generated by the resin gear 1 meshing with another gear by being elastically deformed. Specifically, in a case where an impact is applied to the resin gear 1 as a result of meshing with another gear, the resin member 7 tends to rotate relative to the metal bush 3 in the direction of rotation. At this time, a pair of forces (shearing forces) in opposite directions are generated on the resin member 7 side and the metal bush 3 side in the elastic member 5 disposed in the space K1, the elastic member 5 is elastically deformed from the state that is illustrated in FIG. 3A to the state that is illustrated in FIG. 3B, and the elastic member 5 acts as a detent against the relative rotation. As a result, in a case where an impact is applied as a result of meshing with another gear, the impact is sufficiently absorbed and damped by such elastic deformation. Accordingly, the damper effect of the elastic member 5 can be sufficiently obtained.

Figure 4B:
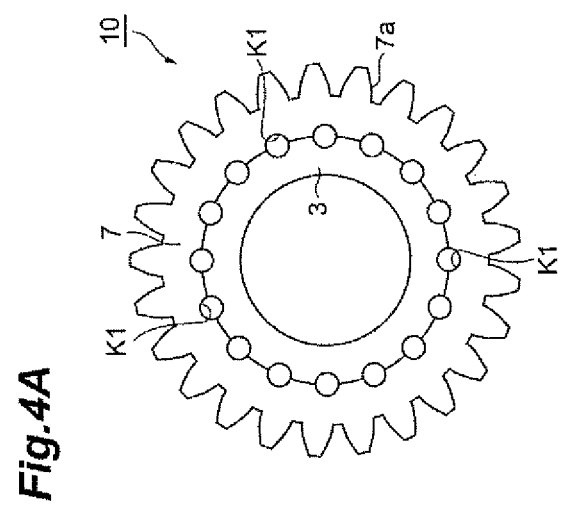
FIG. 4B is a diagram illustrating a continuation of FIG. 4A.
Figure 4A:
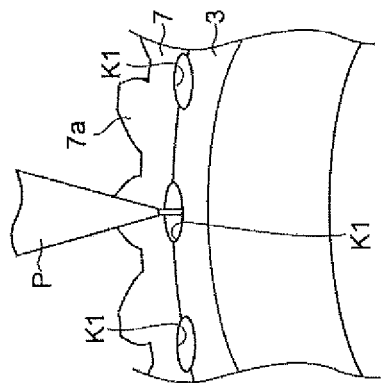
FIG. 4A is a diagram illustrating a resin gear manufacturing method.

In a case where the resin gear 1 described above is manufactured, an intermediate body 10 including the metal bush 3 and the resin member 7 illustrated in FIG. 4A is formed first by a known method. The metal bush 3 is formed by, for example, casting. The resin member 7 is formed by, for example, injection molding. After an adhesive is applied in advance to the inner surface of the space K1, rubber is injected into the space K1 via a pin gate P as illustrated in FIG. 4B, the space K1 is filled with the rubber, and the elastic member 5 is molded in the space K1. Then, necessary processing is performed and the resin gear 1 is manufactured as a result. It should be noted that methods for manufacturing the resin gear 1 are not particularly limited and various methods can be used.

As described above, in a case where an impact is applied to the resin gear 1 according to the present embodiment as a result of meshing with another gear, the elastic member 5 is elastically deformed and acts as a detent and the impact is sufficiently absorbed and dampened. As a result, the damper effect of the elastic member 5 can be sufficiently obtained. It is possible to provide the resin gear 1 as a high-gear strength gear having a built-in rubber damper.

In the cross section along the radial direction, the space K1 and the elastic member 5 in the resin gear 1 according to the present embodiment have the first part where the distance between the outer peripheral surface 3o of the metal bush 3 and the inner peripheral surface 7i of the resin member 7 is the first distance L1, the second part where the distance between the outer peripheral surface 3o and the inner peripheral surface 7i is the second distance L2 different from the first distance L1, and the third part where the distance between the outer peripheral surface 3o and the inner peripheral surface 7i is the third distance L3 different from the first distance L1. The first part is provided between the second part and the third part in the axial direction of the resin gear. As a result, in the resin gear 1, the distance between the outer peripheral surface 3o of the metal bush 3 and the inner peripheral surface 7i of the resin member 7 axially differs in the space K1 and the elastic member 5, and thus axial movement of the elastic member 5 in the space K1 is restricted. Accordingly, in the resin gear 1, axial disengagement of the elastic member 5 from the space K1 can be prevented. Accordingly, in the resin gear 1, the damper effect of the elastic member 5 can be more reliably obtained.

In the resin gear 1 according to the present embodiment, the metal bush 3 and the resin member 7 abut against each other so as to be slidable in the direction of rotation. As a result, it is possible to realize a configuration in which the metal bush 3 and the resin member 7 are disposed so as to be rotatable relative to each other.

In the resin gear 1 according to the present embodiment, the metal bush 3 and the resin member 7 are not bonded to each other. As a result, it is possible to realize a configuration in which the metal bush 3 and the resin member 7 are disposed so as to be rotatable relative to each other.

In the resin gear 1 according to the present embodiment, the elastic member 5 is bonded to the inner surface of the space K1. In this case, the elastic member 5 is unlikely to disengage from the space and the elastic member 5 can be elastically deformed to a large extent. As a result, it is also possible to cope with a case where a large impact is applied to the resin gear 1, and thus it is possible to realize the resin gear 1 that is capable of coping with a high load. It should be noted that the elastic member 5 does not have to be bonded to the inner surface of the space K1 and, in this case, the cost of the resin gear 1 can be reduced.

In the resin gear 1 according to the present embodiment, the space K1 is a hole penetrating the resin gear 1 along the axial direction. In this case, the elastic member 5 can be easily provided between the metal bush 3 and the resin member 7 by injection molding.

Although an embodiment of the present invention has been described above, the present invention is not necessarily limited to the embodiment described above and various modifications can be made within the gist of the present invention.

Figure 5:
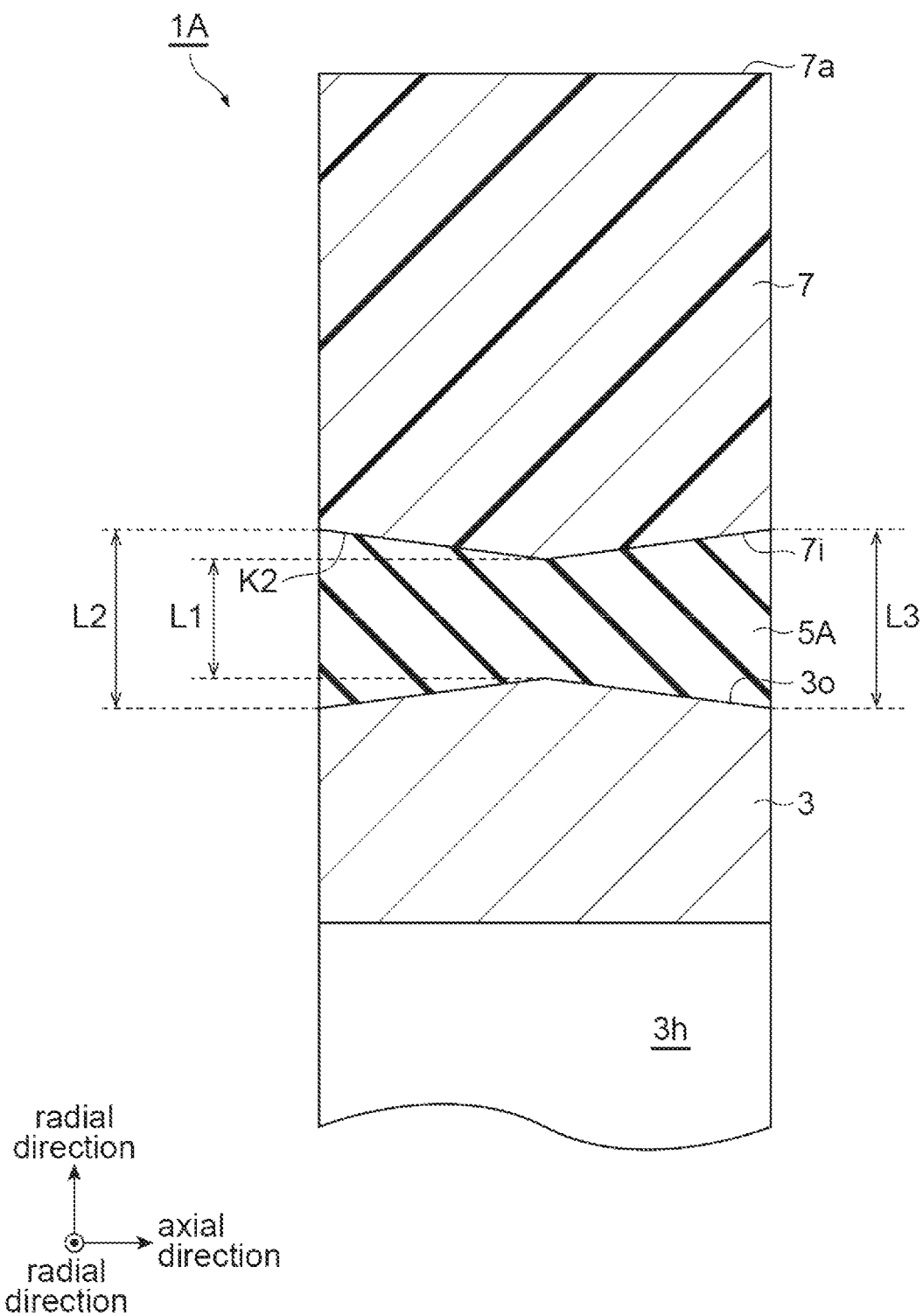
FIG. 5 is a cross-sectional view of a resin gear according to a first modification example.

Although the elastic member 5 is provided in the space K1 between the metal bush 3 and the resin member 7 in the embodiment described above, the present invention is not limited thereto. A space K2 may be formed instead of the space K1 and an elastic member 5A may be provided instead of the elastic member 5 as in a resin gear 1A illustrated in FIG. 5.

The space K2 has a dumbbell shape axially widening from the middle portion to both end portions. The elastic member 5A is disposed in the space K2. In the space K2 and the elastic member 5A, the first distance L1 is less than the second distance L2 and the third distance L3 (L1<L2, L3). In this manner, in the resin gear 1A, the distance between the outer peripheral surface 3o of the metal bush 3 and the inner peripheral surface 7i of the resin member 7 axially differs in the space K2 and the elastic member 5A, and thus axial movement of the elastic member 5A in the space K2 is restricted. Accordingly, in the resin gear 1A, axial disengagement of the elastic member 5A from the space K2 can be prevented. Accordingly, in the resin gear 1A, the damper effect of the elastic member 5A can be more reliably obtained.

Figure 6:
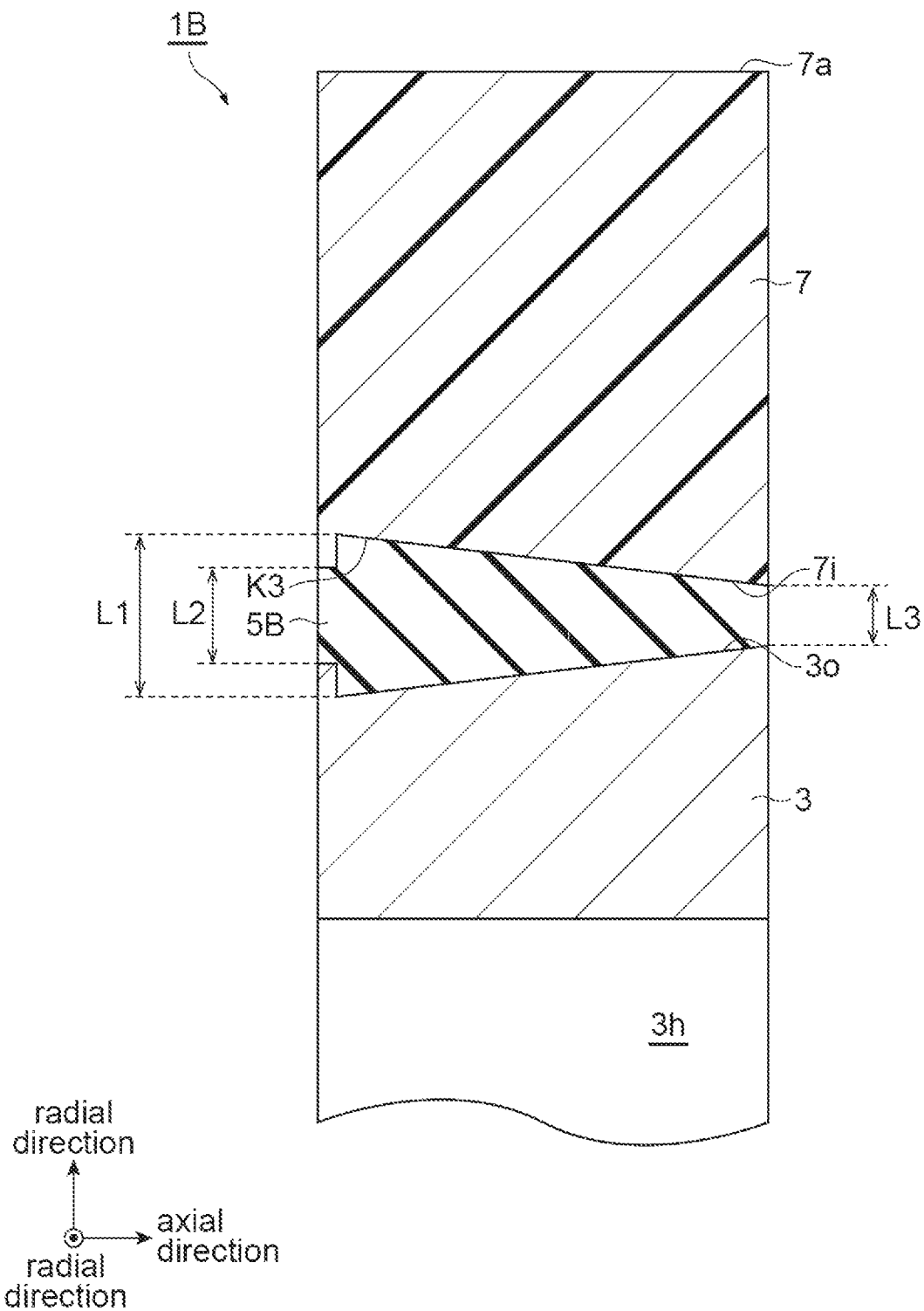
FIG. 6 is a cross-sectional view of a resin gear according to a second modification example.

A space K3 may be formed and an elastic member 5B may be provided as in a resin gear 1B illustrated in FIG. 6.

The space K3 has a stepped truncated cone shape. The elastic member 5B has the same stepped truncated cone shape as the space K3 and is disposed in the space K3. In the space K3 and the elastic member 5B, the first distance L1 is greater than the second distance L2 and the third distance L3 (L1>L2, L3). In this manner, in the resin gear 1B, the distance between the outer peripheral surface 3o of the metal bush 3 and the inner peripheral surface 7i of the resin member 7 axially differs in the space K3 and the elastic member 5B, and thus axial movement of the elastic member 5B in the space K3 is restricted. Accordingly, in the resin gear 1B, axial disengagement of the elastic member 5B from the space K3 can be prevented. Accordingly, in the resin gear 1B, the damper effect of the elastic member 5B can be more reliably obtained.

Figure 7:
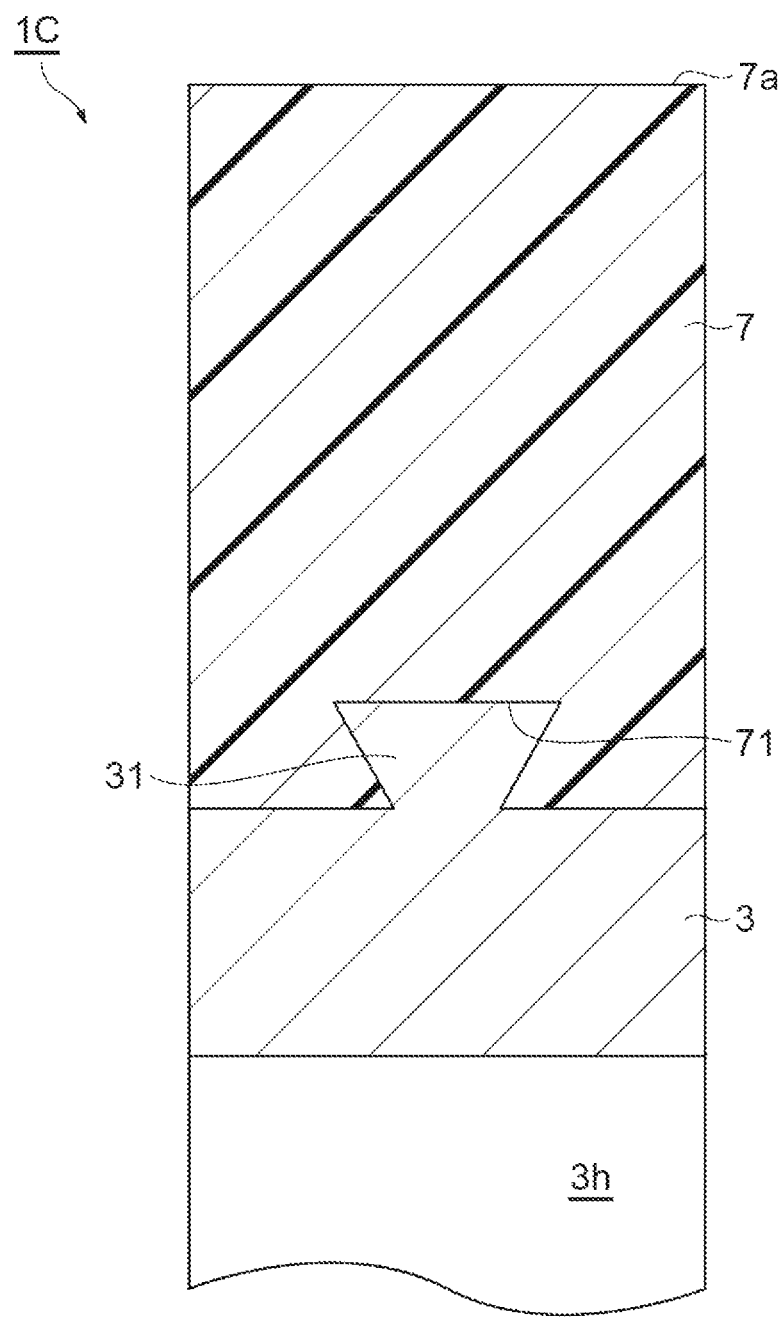
FIG. 7 is a cross-sectional view of a resin gear according to a third modification example.

Although the outer peripheral surface 3o of the metal bush 3 and the inner peripheral surface 7i of the resin member 7 extend straight in the axial direction in the embodiment described above, the present invention is not limited thereto. A projecting portion 31 may be formed on the outer peripheral surface 3o, a recessed portion 71 corresponding to the projecting portion 31 may be formed on the inner peripheral surface 7i, and the projecting portion 31 may be fitted in the recessed portion 71 so as to be slidable in the direction of rotation as in a resin gear 1C illustrated in FIG. 7. As a result, the metal bush 3 and the resin member 7 can be engaged with each other in the axial direction and disengagement of one from the other can be prevented. In addition, during sliding (relative rotation) of the metal bush 3 and the resin member 7 in the direction of rotation, the projecting portion 31 is capable of functioning as a rail guiding the sliding. It should be noted that FIG. 6, unlike FIG. 2, is a cross-sectional view at a cross-sectional position where the elastic member 5 is not illustrated.

The shapes of the space and the elastic member in one aspect of the present invention are not limited to the shapes of the spaces K1 and K2 and the elastic members 5 and 5B of the embodiment described above, and various shapes can be adopted. For example, the space and the elastic member may have a gourd shape, may have a dumbbell shape in which both end portions in the longitudinal direction are round, may have a rod shape extending in the radial direction, and may have a dumbbell shape in which both end portions in the longitudinal direction expand radially outward when viewed from the axial direction.

Although a form in which the resin gear 1 is a spur gear has been described as an example in the embodiment described above, the resin gear 1 may be a helical gear or the like. In the embodiment described above, an adhesive may be interposed between the metal bush 3 and the resin member 7 insofar as the metal bush 3 and the resin member 7 are capable of rotating relative to each other by a certain amount.

In the present invention, the configurations of the above-described embodiment and modification examples may be appropriately combined. The present invention can be variously modified within the gist thereof.

REFERENCE SIGNS LIST 1, 1A, 1B, 1C: resin gear, 3: metal bush, 3o: outer peripheral surface, 5, 5A, 5B: elastic member, 7: resin member, 7a: tooth profile, 7i: inner peripheral surface, K1, K2, K3: space.

The invention claimed is:
1. A resin gear comprising:
an annular metal bush; and
an annular resin member which is provided around the metal bush and comprises a tooth profile formed in an outer peripheral portion,
wherein the metal bush and the resin member are disposed so as to be relatively rotatable in a direction of rotation of the resin gear,
wherein a plurality of spaces entering an outer peripheral surface of the metal bush and an inner peripheral surface of the resin member are formed, so as to be aligned along the direction of rotation, between the metal bush and the resin member,
wherein an elastic member is disposed in each space of the plurality of spaces,
wherein the space and the elastic member comprises, in a cross section along a radial direction of the resin gear:
a first part where a distance between the outer peripheral surface and the inner peripheral surface is a first distance;
a second part where a distance between the outer peripheral surface and the inner peripheral surface is a second distance different from the first distance; and
a third part where a distance between the outer peripheral surface and the inner peripheral surface is a third distance different from the first distance,
wherein the first part is provided between the second part and the third part in an axial direction of the resin gear, and
wherein the space has a hexagonal cross section when viewed from the radial direction.
2. The resin gear according to claim 1, wherein the first distance is longer than the second distance and the third distance.
3. The resin gear according to claim 1, wherein the first distance is shorter than the second distance and the third distance.
4. The resin gear according to claim 1, wherein the metal bush and the resin member abut against each other so as to be slidable in the direction of rotation.
5. The resin gear according to claim 1, wherein the metal bush and the resin member are not bonded to each other.
6. The resin gear according to claim 1, wherein the elastic member is bonded to an inner surface of the space.
7. The resin gear according to claim 1, wherein the space is a hole penetrating the resin gear along the axial direction of the resin gear.
8. The resin gear according to claim 1, wherein the space tapers from a middle portion of the space in the axial direction to both end portions of the space in the axial direction.
9. The resin gear according to claim 1, wherein the space has a dumbbell like cross section when viewed from the radial direction widening from a middle portion of the space in the axial direction to both end portions of the space in the axial direction.
10. The resin gear according to claim 9, wherein the dumbbell like cross section widens linearly from the first part to the second part and the third part in the axial direction.
11. The resin gear according to claim 1, wherein a plurality of the spaces are arranged at a substantially equal interval along the direction of rotation of the resin gear when viewed from the axial direction.
12. The resin gear according to claim 1,
wherein an outer diameter of the metal bush and an inner diameter of the resin member are substantially equal,
wherein the outer peripheral surface of the metal bush and the inner peripheral surface of the resin member are not bonded to each other, and
wherein the outer peripheral surface of the metal bush and the inner peripheral surface of the resin member rotatably contact each other.
13. The resin gear according to claim 1, wherein the hexagonal cross section narrows from the first part to the second part and the third part in the axial direction.

14. The resin gear according to claim 1, wherein the hexagonal cross section narrows linearly from the first part to the second part and the third part in the axial direction.

15. The resin gear according to claim 1,
wherein the first distance is greater than the second distance and the third distance, and
wherein the second distance and the third distance are identical to each other.

16. The resin gear according to claim 1,
wherein the first part corresponds to a middle portion of the space in the axial direction, the second part corresponds to one end portion of the space in the axial direction, and the third part corresponds to the other end portion of the space in the axial direction.

17. A resin gear comprising:
an annular metal bush; and
an annular resin member which is provided around the metal bush and comprises a tooth profile formed in an outer peripheral portion,
wherein the metal bush and the resin member are disposed so as to be relatively rotatable in a direction of rotation of the resin gear,
wherein a plurality of spaces entering an outer peripheral surface of the metal bush and an inner peripheral surface of the resin member are formed, so as to be aligned along the direction of rotation, between the metal bush and the resin member,
wherein an elastic member is disposed in each space of the plurality of spaces,
wherein the space and the elastic member comprises, in a cross section along a radial direction of the resin gear:
a first part where a distance between the outer peripheral surface and the inner peripheral surface is a first distance;
a second part where a distance between the outer peripheral surface and the inner peripheral surface is a second distance different from the first distance; and
a third part where a distance between the outer peripheral surface and the inner peripheral surface is a third distance different from the first distance,
wherein the first part is provided between the second part and the third part in an axial direction of the resin gear, and
wherein the space has an octagonal cross section when viewed from the radial direction.

18. The resin gear according to claim 17, wherein the space has a stepped truncated cone like cross section when viewed from the radial direction.

19. The resin gear according to claim 18,
wherein the stepped truncated cone like cross section along the axial direction comprises;
a top portion formed in the third part;
a bottom portion formed in the first part; and
a step portion formed between the first part and the second part, and
wherein an angle between the bottom portion and the step portion makes a right angle.

20. The resin gear according to claim 19, wherein a distance from the first part to the second part in the axial direction is shorter than a distance from the first part to the third part in the axial direction.

* * * * *